United States Patent
Parrish et al.

[15] 3,676,379
[45] July 11, 1972

[54] POLYURETHANES

[72] Inventors: Donald Bob Parrish; Ronnie Mac Pruitt, both of Lake Jackson, Tex.

[73] Assignee: The Dow Chemical Company, Midland, Mich.

[22] Filed: March 27, 1970

[21] Appl. No.: 23,508

[52] U.S. Cl. ........... 260/2.5 AQ, 260/77.5 AM, 260/77.5 AQ
[51] Int. Cl. .................................. C08g 22/14, C08g 22/44
[58] Field of Search .................. 260/2.5 AQ, 77.5 AQ, 75 T, 260/75 NQ

[56] References Cited

UNITED STATES PATENTS

| | | | |
|---|---|---|---|
| 3,255,253 | 6/1966 | Kuryla | 260/77.5 AQ |
| 3,307,948 | 3/1967 | Thiers | 260/77.5 AQ |
| 3,134,755 | 5/1964 | Müller | 260/2.5 AQ |

OTHER PUBLICATIONS

Product Report Isonol C–100; Upjohn Chemical Co., Sept. 1, 1966, 1 page.

*Primary Examiner*—Donald E. Czaja
*Assistant Examiner*—C. Warren Ivy
*Attorney*—Griswold & Burdick and C. E. Rehberg

[57] ABSTRACT

Novel polyurethanes are prepared in the novel process which comprises reacting a polyisocyanate, such as toluene diisocyanate, with an oxaminated polyol. The oxaminated polyols described herein are polyols which have been reacted with a mixture of an N-substituted aziridine and a monoepoxide; such as polyoxypropylene glycol which has been reacted with a mixture of N-ethyl aziridine and ethylene oxide.

13 Claims, No Drawings

POLYURETHANES

SUMMARY OF THE INVENTION

It has now been discovered that novel polyurethanes are produced in the novel reaction comprising reacting by contacting a polyisocyanate with an oxaminated polyol. By oxaminated polyol is meant the reaction product of (1) an N-substituted aziridine, (2) a monoepoxide, and (3) a polyol, i.e. an aliphatic compound bearing at least two alcoholic hydroxyl groups. The oxaminated polyol may be used in the reaction mixture as the sole source of hydroxyl hydrogen, or it may be included in admixture with a conventional polyol or other oxaminated polyols.

The major advantage of the invention is that the novel process requires little, if any, additional catalyst since the tertiary amino groups contained in the backbone structure act as the catalyst. Further, the novel polyurethanes thus produced have excellent physical properties.

The oxaminated polyols suitable for use in this invention may be represented by the structural formula:

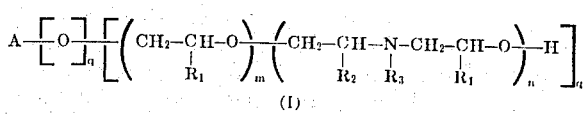

(I)

wherein $A + O \rightarrow_q$ is the g-valent residue derived by removal of $q$ atoms of active hydrogen from a polyol; $q$ is an integer of from 1 to about 8; $m$ is an integer of from 0 to about 150 or more; $n$ is an integer of from 1 to about 60. $R_1$ is hydrogen or alkyl, such as methyl, ethyl, propyl, octyl, decyl, dodecyl, octadecyl, and the like; aryl, such as phenyl, naphthyl, and the like; aralkyl, such as benzyl, phenethyl, 4-phenylbutyl, 3,5-dimethylphenethyl, 4-t-butylbenzyl, 4-decylphenethyl, and the like; alkaryl, such as tolyl, xylyl, 4-butylphenyl, and the like; alkenyl, such as vinyl, allyl, and the like; alkoxyalkyl, such as methoxymethyl, butoxymethyl, and the like; alkenyloxyalkyl, such as allyloxymethyl, butenyloxyethyl, and the like, and is preferably hydrogen, methyl, ethyl, or allyloxymethyl, and is most preferably hydrogen or methyl. $R_2$ is hydrogen or lower alkyl of from one to six carbon atoms, such as methyl, ethyl, butyl and hexyl, and is preferably hydrogen or methyl, and most preferably is hydrogen. $R_3$ is alkyl, such as ethyl, propyl, butyl, octyl, dodecyl and the like; aryl, such as phenyl, and the like; aralkyl, such as benzyl, phenethyl, 3-phenylpropyl, 2,4-dimethylphenethyl, 4-octylbenzyl, 4-dodecylphenethyl, and the like; alkenyl, such as allyl, butenyl, and the like; cycloaliphatic, such as cyclohexyl, cyclopentadienyl, and the like; alkoxycarbonylalkyl such as ethoxycarbonylethyl (carbethoxyethyl), methoxycarbonylethyl-(carbomethoxyethyl), 2-butoxycarbonylpropyl, and the like; alkanoyloxyalkyl, such as acetyloxyethyl, 2-propionyloxypropyl, hexanoyloxyethyl, and the like; alkenoyloxyalkyl, such as acryloyloxymethyl ($CH_2 = CH-COOCH_2-$), methacryloyloxyethyl, 2-methacryloyloxypropyl, and the like, and such groups bearing substituents such as halo, cyano, etc., e.g. 2-chloroethyl, cyanoethyl, etc., and preferably is alkyl or aralkyl of from two to 12 carbon atoms, and is most preferably ethyl, 2-cyanoethyl or phenethyl. Examples of suitable such oxaminated polyols include the reaction product of: (a) water (0.25 to about 15 percent by weight, based on the total composition weight), N-ethylaziridine and ethylene oxide and/or propylene oxide; (b) ethylene glycol or glycerol, N-ethylaziridine and ethylene oxide and/or propylene oxide; (c) sorbitol, N-phenethylaziridine and ethylene oxide; (d) mannitol, N-cyanoethylaziridine and propylene oxide or butylene oxide; (e) glycerol, N-2-hydroxyethyl-aziridine and ethylene oxide, (f) polyethylene glycol or polypropylene glycol, N-ethylaziridine and ethylene oxide and/or propylene oxide; (g) sucrose, N-phenethylaziridine and allyl glycidyl ether; and other like compounds. In (a) water first reacts with the epoxide to form a glycol which is then oxaminated.

The oxaminated polyols are prepared by reacting, in substantially liquid phase, the polyol with an N-substituted aziridine having the formula

wherein $R_2$ and $R_3$ have the above meaning, and an epoxide having the formula

wherein $R_1$ has the above meaning. Suitably, the reaction temperatures range from about 25° C. up to about 250° C. and preferably from about 75° C. up to about 175° C. The pressure is preferably autogenous. The mole ratio of N-substituted aziridine to epoxide may be substantially any value and the net result will be an alternating copolymer of the monomers but the ratio is preferably from about 1:10 to 10:1 and is most preferably from about 1:2 to 2:1. The reaction time varies from a few hours to a few days depending upon the reaction temperature. If desired, the oxaminated polyols may be subsequently reacted with any of the alkylene oxides to further increase the molecular weight of the oxaminated polyol or to provide a particular "end-cap" for the molecule.

The reactivity of the oxaminated polyols with the polyisocyanate increases with increasing amounts of nitrogen in their backbone. Hence, for low reactivity, one would use a high molecular weight polyol to prepare the oxaminated polyol, and vice versa. A mixture of the oxaminated polyol with other polyols likewise can be used to control reactivity.

Suitable polyisocyanates in this invention may be any from the known class of polyisocyanates bearing two or more isocyanate groups and which are conventionally used in preparing polyurethanes. Examples of suitable such polyisocyanates include hexamethylene diisocyanate, 2,4- and/or 2,6-tolylene diisocyanate (TDI), xylylene diisocyanate, diphenylmethane-4,4'-diisocyanate, (MDI), m- and/or p-phenylene diisocyanate, naphthylene diisocyanate, and polymers bearing a plurality of isocyanate groups, such as polymethylene polyphenylisocyanate and the like. MDI, TDI and polymethylene polyphenyl isocyanate are the preferred polyisocyanates. In preparing the polyurethanes, the polyisocyanate and polyol components are mixed in a ratio such that there is about 0.9 isocyanate equivalent per hydroxy equivalent and preferably from 1 to about 1.15 isocyanate equivalents per hydroxy equivalent.

Other ingredients may be included in the polyurethane compositions, such as conventional metal salt catalysts, such as stannous oleate, stannous octoate, dibutyltin dilaurate, and the like, as illustrated in U.S. Pat. No. 3,391,091, fire-retardant agents, such as a phosphorus-containing polyol, blowing agents, fillers, cell-control agents and the like.

Suitable blowing agents include the low-boiling hydrocarbons and halohydrocarbons, such as methylene chloride, trichlorofluoromethane, and the like. In flexible polyurethane foams, water may also be employed as a blowing agent.

Suitable cell-control agents include silicone oils, and other known compounds.

The subject polyurethanes can be formulated and processed in a conventional manner to produce both rigid and flexible polyurethane foams, including those known as semi-rigid and semi-flexible as well as the non-foamed polyurethane elastomers.

SPECIFIC EMBODIMENTS

The following examples further illustrate the invention.

EXAMPLE 1

N-Ethylaziridine (315 g.), propylene oxide (234 g.) and polypropylene glycol (2,000 g.; prepared by condensing propylene oxide (PO) onto a glycerol in the presence of KOH; average molecular weight of 3,000) were charged into an autoclave. The autoclave was sealed and heated to 175°–185° C. and maintained at that temperature for 20 hours. The volatiles were removed from the reaction mixture under reduced pressure leaving 2,456 g. of product. The product had a viscosity of 497 centistokes at 25° C., a Gardner color of 1 and a 1.58 percent hydroxyl content, percent by weight based on the total product weight.

Several polyurethane foams were prepared using the oxaminated polyol prepared above in the following formulations:

TABLE 1

| Component | Run No. 1 | 2 | 3 |
|---|---|---|---|
| Polypropylene Glycol[1] | 100 | 75 | — |
| Oxaminated Polyol[2] | — | 25 | 100 |
| Stannous Octoate | 0.35 | .15 | 0.35 |
| Water | 4.0 | 4.0 | 4.0 |
| TDI 80/20[3] | 51.0 | 49.5 | 49.2 |
| Niax A-1[4] | 0.25 | — | — |

[1]Polypropylene glycol — molecular weight of 3,000, as described above.
[2]Oxaminated polyol — the above reaction product.
[3]TDI 80/20 — an 80/20 mixture by weight of 2,4-tolylene diisocyanate and 2,6tolylene diisocyanate, respectively.
[4]Niax A-1 — a commercially available product which is bis(dimethylamino) ethyl ether.

In the examples, all of the components, except the polyisocyanate component, were first blended together, the polyisocyanate was then blended into the mixture and the resultant formulation allowed to stand at room temperature until the reaction ceased.

The physical properties of the resulting foams were determined and are summarized below.

TABLE 2

| | Run No. 1 | 2 | 3 |
|---|---|---|---|
| Density, lbs/ft$^3$ | 1.49 | 1.55 | 1.53 |
| Modulus* | 1.61 | 1.81 | 1.63 |
| Tensile, psi. | 14.4 | 16.1 | 13 |
| Elongation, % | 178 | 230 | 176 |
| Tear Resistance, lbs/in. | 2.4 | 2.1 | 2.3 |
| Compression Set., 90% | 6.9 | 7.9 | 6.5 |
| % Hystersis Return | 69 | 75 | 67 |
| Rise Time, sec. | 70 | 70 | 72 |

* Sag factor which is 65% Indentation Load Deflection/25% Indentation Load Deflection Rigid polyurethanes are prepared by using oxaminated polyols described herein derived from polyols having a high degree of functionality and/or a low molecular weight, such as sorbitol, sucrose.

Flexible polyurethanes are prepared by using oxaminated polyols described herein derived from polyols having a low degree of functionality and/or a high molecular weight, such as polypropylene glycol or glycerol initiated polypropylene glycol.

Curable polyurethanes are prepared by using oxaminated polyols described herein bearing polymerizable vinyl groups, i.e. $R_1$ and/or $R_3$ are alkenyl groups, such as vinyl, allyl, p-vinyl benzyl, etc., within the definition of $R_1$ and $R_8$ above. Such polyurethanes may be vulcanized with sulfur or other known cross-linking agents for vinyl compounds. Additionally, curable polyurethanes are prepared by using an excess of the polyisocyanate component in the reaction so that the resulting polyurethane bears available isocyanate groups for cross-linking; such polymers may be cured with water, glycols, and other active hydrogen containing compounds.

We claim:

1. A polyurethane composition comprising, in a chemically combined form, (a) a polyisocyanate and (b) an oxaminated polyol having the structural formula

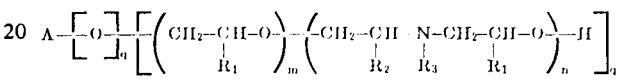

wherein $A + O +_q$ is a $q$-valent residue derived by removal of $q$ atoms of active hydrogen from an aliphatic polyol; $q$ is an integer of from 1 to 8; $m$ is an integer of from 0 to 150; n is an integer of from 1 to 60; $R_1$ is hydrogen, alkyl, aryl, alkaryl, alkenyl, alkoxyalkyl or alkenyloxyalkyl; $R_2$ is hydrogen or lower alkyl of from one to six carbon atoms; $R_3$ is alkyl of from 1–4 carbon atoms, aralkyl, alkenyl, cycloaliphatic, alkoxycarbonylalkyl, alkanoyloxyalkyl, alkenyloxyalkyl, or such groups bearing halo- or cyano-substituents.

2. The composition defined in claim 1 wherein (a) is at least one of hexamethylene diisocyanate, 2,4-tolylene diisocyanate, 2,6-tolylene diisocyanate, xylylene diisocyanate, diphenylmethane-4,4'-diisocyanate, m- or p-phenylene diisocyanate, naphthylene diisocyanate or polymethylene polyphenylisocyanate.

3. The composition defined in claim 2 wherein (a) is at least one of 2,4-tolylene diisocyanate, 2,6-tolylene diisocyanate, diphenylmethane-4,4'-diisocyanate, or polymethylene polyphenylisocyanate.

4. The composition defined in claim 1 wherein $R_1$ is hydrogen, methyl, ethyl or allyloxy.

5. The composition defined in claim 1 wherein $R_2$ is hydrogen or methyl.

6. The composition defined in claim 1 wherein $R_3$ is alkyl of from two to four carbon atoms or aralkyl of from two to 12 carbon atoms.

7. The composition defined in claim 1 wherein $R_3$ is ethyl, 2-cyanoethyl or phenethyl.

8. The composition defined in claim 1 as a foam.

9. The composition defined in claim 4 wherein $R_2$ is hydrogen or methyl.

10. The composition defined in claim 9 wherein $R_3$ is alkyl or aralkyl of from two to 12 carbon atoms.

11. The composition defined in claim 3 wherein $R_1$ is hydrogen, methyl, ethyl or allyloxy; $R_2$ is hydrogen; and $R_3$ is ethyl, 2-cyanoethyl or phenethyl.

12. The composition defined in claim 1 wherein said aliphatic polyol is ethylene glycol, glycerol, sorbitol, mannitol, sucrose, polyethylene glycol, or polypropylene glycol.

13. The composition defined by claim 11 wherein said aliphatic polyol is ethylene glycol, glycerol, sorbitol, mannitol, sucrose, polyethylene glycol, or polypropylene glycol.

* * * * *